(12) United States Patent
Jeong

(10) Patent No.: US 9,853,300 B2
(45) Date of Patent: Dec. 26, 2017

(54) BIPOLAR PLATE STRUCTURE FOR FUEL CELL

(71) Applicant: HYUNDAI MOTOR COMPANY, Seoul (KR)

(72) Inventor: Hee Seok Jeong, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 33 days.

(21) Appl. No.: 14/956,255

(22) Filed: Dec. 1, 2015

(65) Prior Publication Data
US 2016/0344040 A1 Nov. 24, 2016

(30) Foreign Application Priority Data
May 20, 2015 (KR) .................. 10-2015-0070263

(51) Int. Cl.
H01M 8/02 (2016.01)
H01M 8/0267 (2016.01)
H01M 8/0258 (2016.01)

(52) U.S. Cl.
CPC ....... *H01M 8/0267* (2013.01); *H01M 8/0258* (2013.01)

(58) Field of Classification Search
CPC ... H01M 8/0267; H01M 8/0258; H01M 8/026
See application file for complete search history.

(56) References Cited

U.S. PATENT DOCUMENTS

| 7,781,122 B2* | 8/2010 | Beutel | H01M 8/0228 429/457 |
| 8,518,596 B1* | 8/2013 | Owejan | H01M 8/0234 429/480 |
| 2009/0098435 A1* | 4/2009 | Shibata | H01M 8/0247 429/458 |
| 2011/0244269 A1* | 10/2011 | Kato | G11B 5/66 428/828 |
| 2012/0129071 A1* | 5/2012 | Sato | H01M 8/0204 429/457 |

(Continued)

FOREIGN PATENT DOCUMENTS

| JP | 2004-039483 A | 2/2004 |
| JP | 2005-085626 A | 3/2005 |
| JP | 2008-293808 A | 12/2008 |

(Continued)

*Primary Examiner* — Muhammad Siddiquee
(74) *Attorney, Agent, or Firm* — McDermott Will & Emery LLP

(57) ABSTRACT

A bipolar plate structure for a fuel cell includes a cathode bipolar plate having a first flow field section to form cathode channels between the first flow field section and a first gas diffusion layer and a first land section to form coolant channels. An anode bipolar plate has a second flow field section to form anode channels between the second flow field section and a second gas diffusion layer and a second land section to form coolant channels. The cathode channels have an interdigitated channel structure, and the anode channels have a parallel channel structure. An air inlet manifold hole is formed along one of two long-side edge portions of a reaction region in the cathode and anode bipolar plates. An air outlet manifold hole is formed along the other of the two long-side edge portions of the reaction region.

11 Claims, 20 Drawing Sheets

(56) References Cited

U.S. PATENT DOCUMENTS

2015/0349353 A1* 12/2015 Hood .................. H01M 8/0258
429/514

FOREIGN PATENT DOCUMENTS

| | | |
|---|---|---|
| JP | 2009-037759 A | 2/2009 |
| JP | 2010-073564 A | 4/2010 |
| JP | 2010-073565 A | 4/2010 |
| JP | 2011-159572 A | 8/2011 |
| JP | 2011-192525 A | 9/2011 |
| JP | 2012-503857 A | 2/2012 |
| JP | 2012-243570 A | 12/2012 |
| JP | 2014-229446 A | 12/2014 |
| KR | 10-2003-0060668 A | 7/2003 |
| KR | 10-2005-0016963 A | 2/2005 |
| KR | 10-2007-0035859 A | 4/2007 |
| KR | 10-2011-0031566 A | 3/2011 |

* cited by examiner

-- Related Art --

-- Related Art --

-- Related Art --

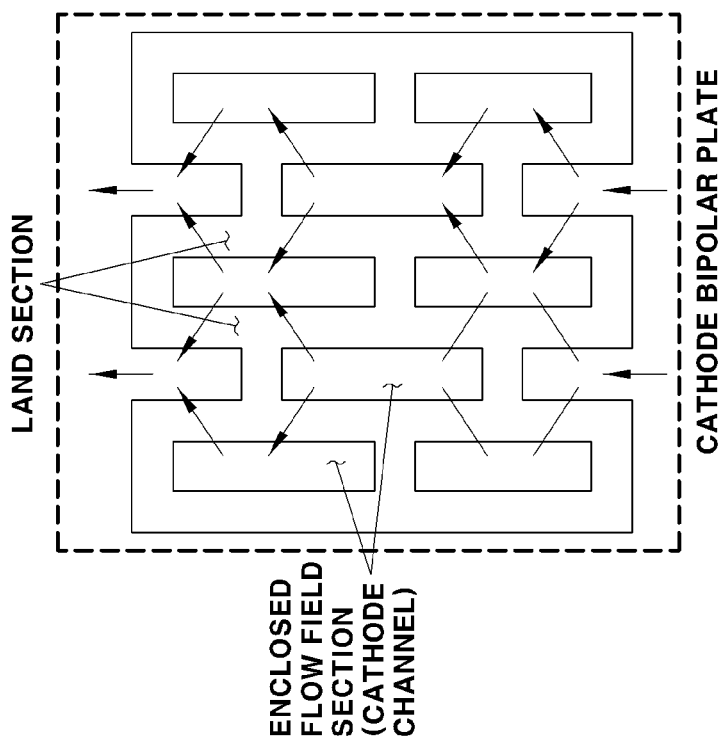

US 9,853,300 B2

BIPOLAR PLATE STRUCTURE FOR FUEL CELL

CROSS-REFERENCE TO RELATED APPLICATION

This application claims under 35 U.S.C. §119(a) the benefit of priority to Korean Patent Application No. 10-2015-0070263 filed on May 20, 2015, the entire content of which is incorporated herein by reference.

TECHNICAL FIELD

The present disclosure relates to a bipolar plate structure for a fuel cell. More particularly, the present disclosure relates to a bipolar plate structure for a fuel cell, capable of achieving uniform power generation in an entire reaction region, increasing a limiting current density and a power density, and improving performance and efficiency of the fuel cell.

BACKGROUND

A polymer electrolyte membrane fuel cell (PEMFC) generates electricity by electrochemical reaction between hydrogen as fuel gas and oxygen (or air) as oxidant gas, which are reactant gases.

The PEMFC has high efficiency, high current density, high power density, short start-up time, and rapid response to a load change, compared to other types of fuel cells. Accordingly, the PEMFC has been used in various applications, such as a power source for zero-emission vehicles, an independent power plant, and a military power source.

In general, a fuel cell has a stack structure in which cells are stacked and assembled in order to satisfy a required power level. Accordingly, a fuel cell mounted in a vehicle also has a stack structure in which several hundreds of cells are stacked in order to satisfy the required high power level.

A membrane-electrode assembly (MEA) is positioned in the center of each unit cell of the fuel cell stack. The MEA includes a solid polymer electrolyte membrane through which hydrogen cations (protons) are transported, and a catalyst electrode configured by applying catalysts on both surfaces of the electrolyte membrane. That is, the catalyst electrode includes an anode (hydrogen electrode) and a cathode (air electrode).

In addition, a gas diffusion layer (GDL), a gasket for preventing a gas leak, etc. are stacked outside the MEA, namely at outer portions where the anode and the cathode are located. A bipolar plate has flow fields, through which reactant gases, coolant, and water produced by reaction flow, and is bonded to an outer side of the GDL.

According to the conventional art as described above, an oxidation reaction of hydrogen as a fuel occurs in the anode of the fuel cell stack to generate hydrogen ions and electrons. The generated hydrogen ions and electrons are transmitted to the cathode through the electrolyte membrane and the bipolar plate, respectively.

Thus, electrical energy is produced by the flow of electrons, and water and heat are produced by the electrochemical reaction, in which the hydrogen ions and electrons transmitted from the anode and oxygen in the air participate, in the cathode.

The bipolar plate divides the unit cells in the fuel cell stack, and at the same time, serves as a current path (a path for transferring generated electricity) between the unit cells. The flow fields formed in the bipolar plate serve as a path for transferring reactant gases to the GDL, a path for the pass of coolant, and a path for discharging water, which is produced by the electrochemical reaction and is discharged through the GDL, to the outside.

Such a bipolar plate includes a graphite bipolar plate made of a graphite material, and a metallic bipolar plate made of a metal material such as stainless steel. A study to replace the graphite bipolar plate with the metallic bipolar plate is actively ongoing in consideration of processability and mass production.

However, it is difficult for the metallic bipolar plate manufactured by press working to realize a complex shape. For this, the metallic bipolar plate uses a thin plate material, and thus, it is possible to reduce the thickness and weight of the bipolar plate and the volume of the unit cell.

In general, after bipolar plates are manufactured by forming relief/intaglio patterns in a metal plate material through press working in a mold, two bipolar plates are coupled to each other. Accordingly, coolant flows in a channel space defined by contact of the bipolar plates, and GDLs are disposed at both sides of the bipolar plates so that hydrogen and oxygen flow in respective channel spaces defined between the GDLs and the bipolar plates so as to transfer reactant gases.

FIG. 1 is a top view illustrating a typical metallic bipolar plate structure for a fuel cell. Referring to FIG. 1, a bipolar plate 10 generally has a rectangular shape. The bipolar plate 10 has a reaction region 11 which has flow fields for air, hydrogen, and coolant. Opposite end portions of the reaction region 11 have inlet manifold holes 12, 14, and 16 and exit manifold holes 13, 15, and 17 through which air, hydrogen, and coolant enter and exit, respectively.

Humidified air and hydrogen are supplied as reactant gases from an external source of a stack through the air and hydrogen inlet manifold holes 12 and 14 to operate the fuel cell. Gas-phase or liquid-phase water produced in the fuel cell in addition to the supplied reactant gases is discharged through the air and hydrogen outlet manifold holes 13 and 15 to the outside of the stack.

That is, the reactant gases and the water produced in the cell are discharged through the air outlet manifold hole 13, and the reactant gases and the water, which is produced in a cathode and then permeates an electrolyte membrane to be transmitted to an anode, are discharged through the hydrogen outlet manifold hole 15.

In each bipolar plate of the fuel cell stack, the reactant gases (the air including the hydrogen as fuel gas and the oxygen as oxidant gas) and the coolant, which are supplied through the inlet manifold holes 12, 14, and 16, are distributed to the flow fields (cathode/anode/coolant channels) of each cell to react and be cooled. Then, the reactant gases and the coolant are merged in the outlet manifold holes 13, 15, and 17 to be discharged to the outside of the stack, as illustrated in FIG. 2.

FIGS. 3A and 3B are cross-sectional views of the fuel cell illustrating a cathode channel and an anode channel through which reactant gases flow, and a coolant channel. Reference numeral 21 refers to an MEA including a catalyst layer (a catalyst electrode, i.e. a cathode and an anode).

Here, each portion at which the bipolar plate 10 is in contact with the GDL 22 refers to a land section 10a, and each portion at which one bipolar plate is in contact with another bipolar plate refers to a channel section 10b.

In addition, flow fields formed by the channel section 10b refer to channels through which the reactant gases flow, which are a cathode channel (air channel) 11a through which air (oxygen) flows and an anode channel (hydrogen channel)

11b through which hydrogen flows. A flow field formed by the land section 10a refers to a coolant channel 11c through which coolant flows.

The flow fields of the bipolar plate are classified into the cathode channel 11a, the anode channel 11b, and the coolant channel 11c, and the air, hydrogen, and coolant flow in a parallel direction to the flow fields of the bipolar plate. The bipolar plate manufactured by processing a metal material using a press causes design restrictions due to the shape of the bipolar plate itself.

The metallic bipolar plate has the flow fields designed in various manners because it is difficult to achieve a complex shape, but the flow field pattern has the same form as a typical channel shape.

That is, the flow fields through which the reactant gases flow have relief and intaglio patterns formed on a flat and thin plate metal material, and the coolant or other gases flow through the flow fields formed on the opposite surface thereof.

In addition, the conventional bipolar plate generally has long channels which are arranged in parallel throughout the reaction region or has inclined flow fields. The bipolar plate has advantages and disadvantages in terms of performance, pressure characteristics, and drainage characteristics according to the design of the flow fields of the bipolar plate. However, the flow fields having a rectangular cross section, a trapezoid cross section, or a cross section similar to the same are commonly formed in a portion corresponding to the reaction region of the bipolar plate such that the reactant gases are supplied therethrough.

The bipolar plate has a portion in which flow fields are formed and another portion in which flow fields are not formed. The portion, in which flow fields are formed, is a flow field section (including the above channels) having the flow fields for reactant gases, and the other portion, in which flow fields are not formed, is a land section.

The flow field section is typically distinguished from the land section in the bipolar plate. The diffusion amount of gas transferred to the GDL varies due to a flow difference between the flow field section and the land section. This nonuniformity causes a concentration difference between the flow field section and the land section in the MEA in which the electrochemical reaction occurs. For this reason, it is difficult to expect uniform power generation in the entire reaction region due to a difference in the electrochemical reaction.

In the conventional bipolar plate, the reactant gases such as air and hydrogen flow in the direction perpendicular to the direction in which the substances are transferred to the catalyst layer where the electrochemical reaction occurs. For this reason, the bipolar plate has a disadvantage in that the substances are transferred to the catalyst layer depending on only diffusion by a concentration difference and a partial pressure difference between the channels 11a and 11b and the MEA 21.

That is, since the flow direction of the reactant gases is perpendicular to the direction in which the substances are transferred to the catalyst layer where the electrochemical reaction occurs, the substances are transferred through the GDL 22 to the catalyst layer using only diffusion by a pressure difference at the inlet and the outlet between the flow field channels 11a and 11b for the reactant gas and a concentration difference between the channels 11a and 11b and the catalyst layer.

This method is a passive transfer method in terms of supplying the reactant gases to a required portion. Therefore, it is difficult to transfer the substances to the catalyst layer by the flow in the bipolar plate.

Therefore, the limiting current density of the fuel cell decreases, and thus, the performance of the fuel cell may deteriorate. In addition, the performance of the fuel cell may not be improved in a high power section, and it is difficult to discharge water as a by-product produced by the electrochemical reaction since it is difficult to remove water present in the GDL.

Moreover, since the reactant gas concentration required for the electrochemical reaction is not transferred to the catalyst layer in the rear end portion (the outlet portion) of the flow field channel, a power loss may result.

The above information disclosed in this Background section is only for enhancement of understanding of the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with prior art.

In one aspect, the present disclosure provides a bipolar plate structure for a fuel cell, capable of achieving uniform power generation in an entire reaction region, increasing a limiting current density and a power density, and improving performance and efficiency of the fuel cell.

In another aspect, the present disclosure provides a bipolar plate structure for a fuel cell, capable of improving water discharge capability in a gas diffusion layer (GDL) and improving thermal efficiency by increasing a contact region with coolant.

According to an exemplary embodiment, a bipolar plate structure for a fuel cell includes a cathode bipolar plate having a first flow field section to form cathode channels between the first flow field section and a first gas diffusion layer and a first land section to form coolant channels in a state in which the first land section is bonded to the first gas diffusion layer. An anode bipolar plate has a second flow field section to form anode channels between the second flow field section and a second gas diffusion layer and a second land section to form coolant channels in a state in which the second land section is bonded to the second gas diffusion layer. The cathode channels have an interdigitated channel structure, and the anode channels have a parallel channel structure in which flow fields are arranged in parallel with each other. An air inlet manifold hole is formed along one of two long-side edge portions of a reaction region, in which the first and second flow field sections and the first and second land sections are formed, in the cathode bipolar plate and the anode bipolar plate. An air outlet manifold hole is formed along the other of the two long-side edge portions of the reaction region. A longitudinal direction of each of the cathode channels is a width direction of the reaction region.

A hydrogen inlet manifold hole may be formed along one of two short-side edge portions of the reaction region in the cathode bipolar plate and the anode bipolar plate, and a hydrogen outlet manifold hole may be formed along the other of the two short-side edge portions.

The longitudinal direction of each of the cathode channels may intersect with a longitudinal direction of each of the anode channels.

A longitudinal direction of each of the anode channels may be a longitudinal direction of the reaction region so that the longitudinal direction of each of the cathode channels is perpendicular to a longitudinal direction of each of the anode channels.

When surfaces of the first land section and the second land section are respectively bonded to the first and second gas diffusion layers of two adjacent fuel cells, coolant channels are formed on an opposite surface of each surface of the first and second land sections in a zigzag path form such that a longitudinal path and a transverse path of the coolant channels alternately repeat.

The first land section may have a zigzag path form such that a longitudinal portion and a transverse portion thereof alternately repeat.

At least one portion of the first land section may have a closed form to form a plurality of enclosed flow field sections to block the entire circumference of each enclosed flow field section in the state in which the first land section is bonded to the first gas diffusion layer.

Coolant inlet and outlet manifold holes may be formed at corner portions of the reaction region.

An air inlet manifold hole may elongate along a central portion between the cathode bipolar plate and the anode bipolar plate in a longitudinal direction of the cathode and anode bipolar plates. Air outlet manifold holes may elongate at both long-side edge portions of the cathode bipolar plate and the anode bipolar plate in the longitudinal directions of the respective bipolar plates. Reaction regions in which the first and second flow field sections and the first and second land sections are formed may be respectively located between one of the air outlet manifold holes and the air inlet manifold hole and between the other of the air outlet manifold holes and the air inlet manifold hole at the central portion.

An air inlet manifold hole may elongate at one of both long-side edge portions of the cathode bipolar plate and the anode bipolar plate in a longitudinal direction of the cathode and anode bipolar plates. An air outlet manifold hole may elongate at the other of the long-side edge portions in the longitudinal direction of the cathode and anode bipolar plates. A hydrogen inlet manifold hole may be formed at one of both short-side edge portions of the cathode bipolar plate and the anode bipolar plate in a width direction of the cathode and anode bipolar plates. A hydrogen outlet manifold hole may elongate at the other of the short-side edge portions in the width direction of the cathode and anode bipolar plates. One reaction region in which the first and second flow field sections and the first and second land sections are formed may be surrounded by the air inlet and outlet manifold holes and the hydrogen inlet and outlet manifold holes.

Each of the cathode bipolar plate and the anode bipolar plate may be a metallic bipolar plate which is pressed to form the first and second land sections and the first and second flow field section.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present disclosure.

FIGS. 7A-7D are top views illustrating a bipolar plate for a fuel cell and a flow field structure thereof according to a further embodiment of the present inventive concept.

Figure 1:
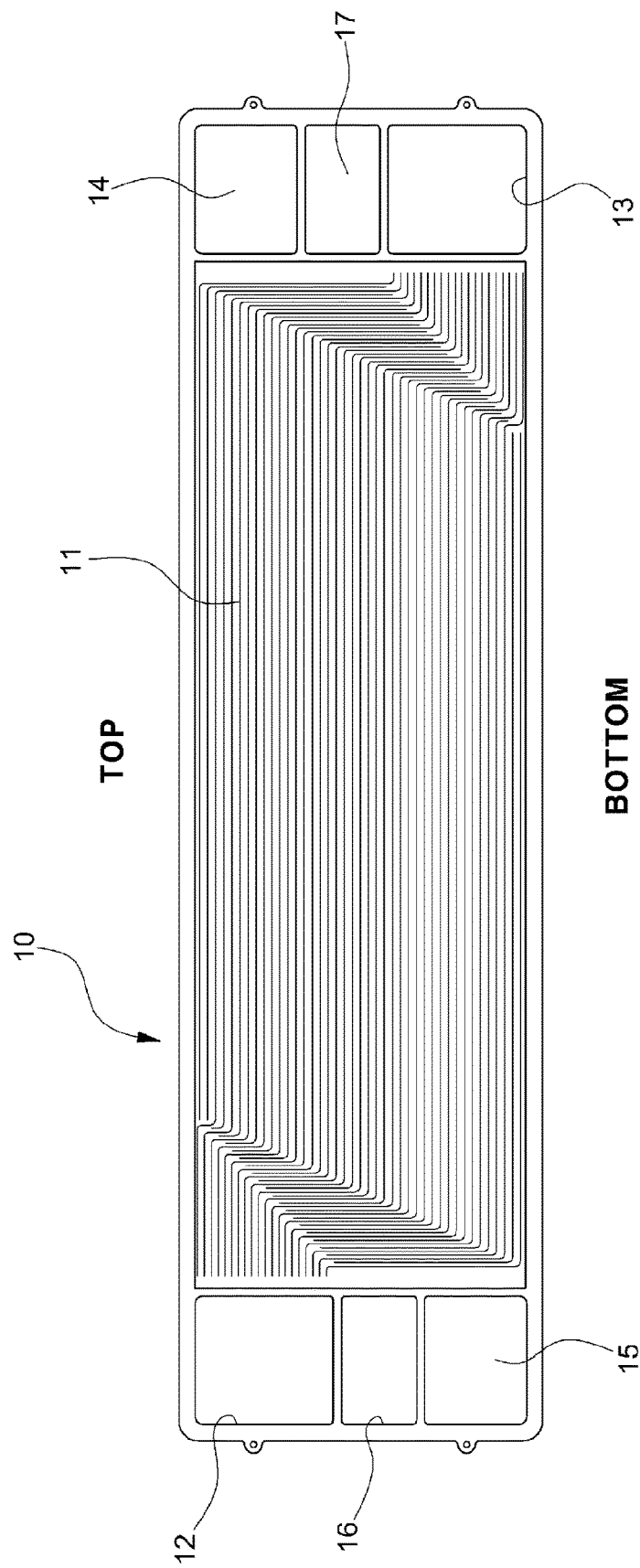
FIG. 1 is a top view illustrating a conventional bipolar plate for a fuel cell stack.
Figure 2:
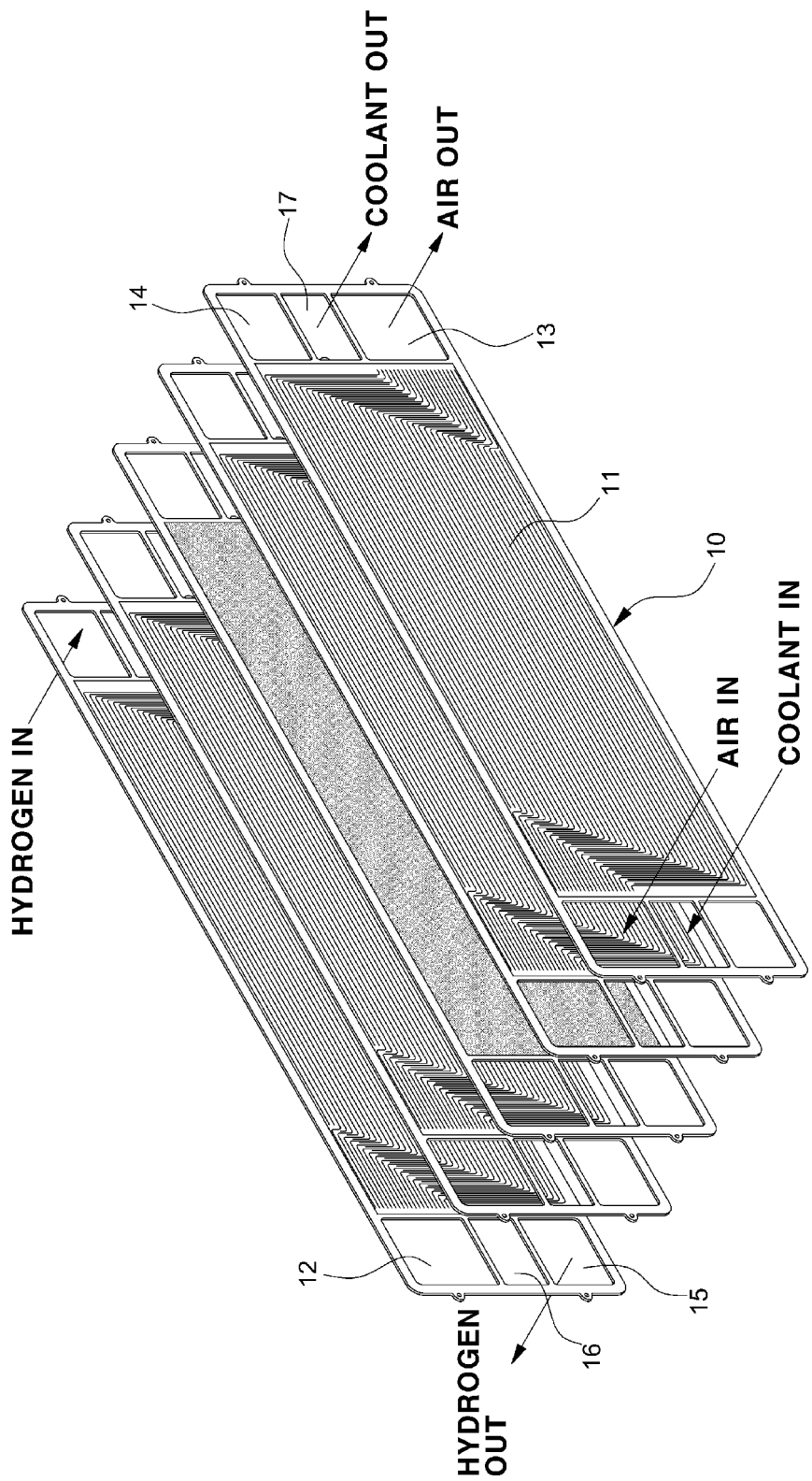
FIG. 2 is a perspective view illustrating the conventional bipolar plate for a fuel cell stack and a fluid flow direction.
Figure 3A:
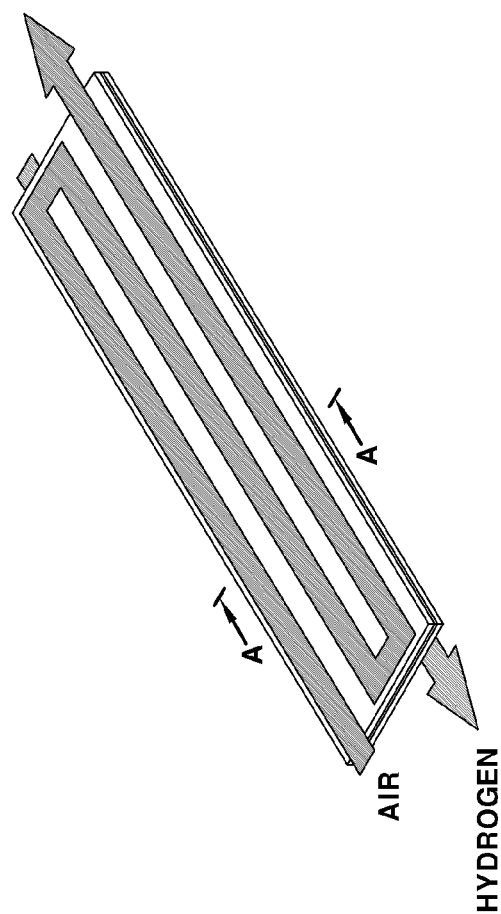
FIGS. 3A and 3B are cross-sectional views of a cell illustrating a cathode channel and an anode channel through which reactant gases flow, and a coolant channel in the conventional fuel cell stack.
Figure 3B:
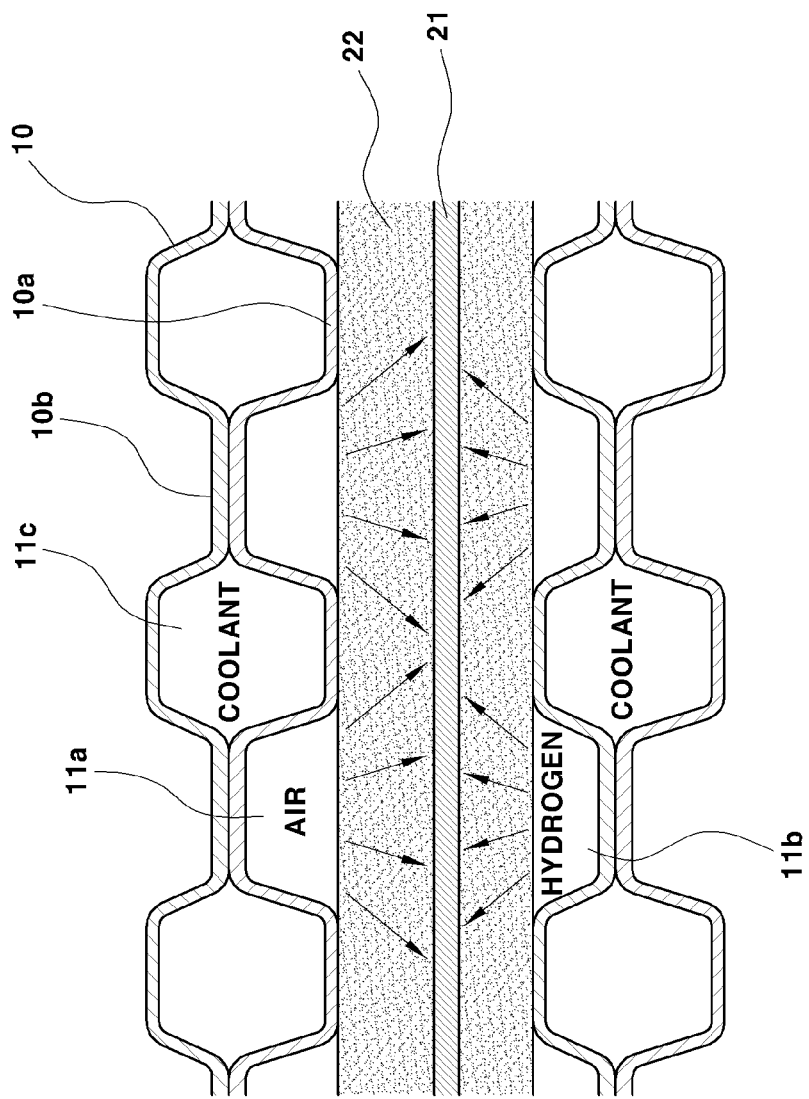

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present inventive concept, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

As describe above, since the conventional bipolar plate for a fuel cell transfers the substances to the catalyst layer using only the diffusion of the reactant gases, it is difficult to achieve the uniform power generation in the entire reaction region due to the nonuniform gas concentration between the flow field section and the land section, the limiting current density is low, and it is difficult to improve the water discharge capability in the GDL and the performance in the high power section.

In contrast, since a bipolar plate of the present disclosure has an interdigitated channel structure, it is possible to overcome the above disadvantages. In addition, it is possible to minimize a space for uniform distribution of reactant gases and coolant from manifold holes to channels through the new channel structure and to contribute to an improvement in fuel cell efficiency and an improvement in power density.

Figure 4:
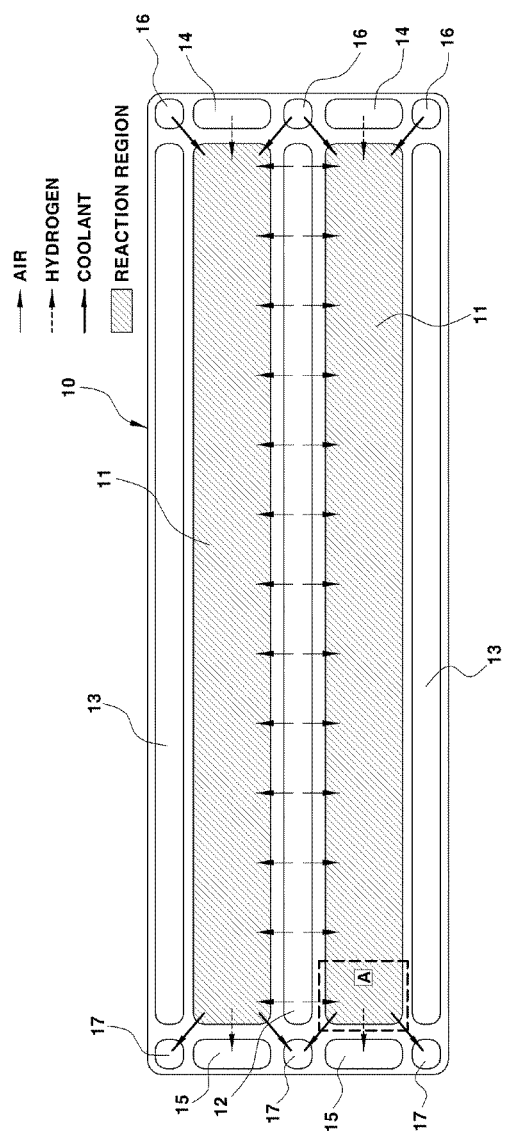
FIG. 4 is a top view illustrating a bipolar plate for a fuel cell according to an embodiment of the present inventive concept.

FIG. 4 is a top view illustrating a bipolar plate for a fuel cell according to an embodiment of the present inventive concept. As illustrated in the drawing, a bipolar plate 10 according to the present disclosure may be a metallic bipolar plate manufactured in a rectangular shape by press working (stamping) in a mold. The bipolar plate (a cathode bipolar plate and an anode bipolar plate to be described later) 10 includes an air inlet manifold hole 12, which is elongated in a longitudinal direction of the bipolar plate 10 along a central portion thereof, for supply air to cathode channels in an associated reaction region 11. An air outlet manifold hole 13 is elongated in the longitudinal direction of the bipolar plate 10 along each of both long-side edge portions thereof and discharges the air passing through the cathode channels.

The air inlet manifold hole 12 and the air outlet manifold hole 13 form air paths communicating with each other, which are an air inlet manifold and an air outlet manifold through which air is supplied or discharged to each bipolar plate 10, in a state in which a fuel cell stack is assembled by stacking cells including the bipolar plate 10.

In addition, hydrogen inlet and outlet manifold holes 14 and 15 and coolant inlet and outlet manifold holes 16 and 17 are formed at both short-side edge portions of the bipolar plate 10. The hydrogen inlet manifold holes 14 and the coolant inlet manifold holes 16 are formed at one of the short-side edge portions, for supplying and distributing hydrogen and coolant to anode channels and coolant channels in the respective reaction regions 11. The hydrogen outlet manifold holes 15 and the coolant outlet manifold holes 17 are formed at the other of the short-side edge portions, for discharging the hydrogen and the coolant passing through the respective anode channels and coolant channels.

The hydrogen inlet manifold hole 14 and the hydrogen outlet manifold hole 15 are elongated in a width direction of each reaction region 11 along each short-side edge portion. In this case, the coolant inlet manifold hole 16 and the coolant outlet manifold hole 17 are located at peripheral corner portions of each reaction region 11.

Similar to the air inlet and outlet manifold holes 12 and 13, the hydrogen inlet manifold hole 14 and the hydrogen outlet manifold hole 15 form hydrogen paths communicating with each other, which are a hydrogen inlet manifold and a hydrogen outlet manifold through which hydrogen is supplied or discharged to each bipolar plate 10, in the state in which the bipolar plates 10 of the fuel cell stack are stacked.

In addition, the coolant inlet manifold hole 16 and the coolant outlet manifold hole 17 form coolant paths communicating with each other, which are a coolant inlet manifold and a coolant outlet manifold through which coolant is supplied or discharged to each bipolar plate 10, in the state in which the bipolar plates 10 of the fuel cell stack are stacked.

Accordingly, in the bipolar plate 10 of the present disclosure, a distance between the air inlet manifold hole 12 and each of the air outlet manifold holes 13 is shorter than a distance between the hydrogen inlet manifold hole 14 and the hydrogen outlet manifold hole 15 is longer, as illustrated in FIG. 4. Therefore, each of the cathode channels for moving air from the central portion of the bipolar plate 10 to the long-side edge portion of the bipolar plate 10 has a shorter length than that of each of the anode channels for moving hydrogen from one of the short-side edge portions to the other thereof.

In addition, since the air inlet manifold hole 12 is located at the central portion of the bipolar plate 10, the air introduced through the air inlet manifold hole 12 at the central portion is divided in both directions, and then flows to the air outlet manifold holes 13 which are respectively formed at the both long-side edge portions of the bipolar plate 10 through the cathode channels in the associated reaction region 11.

Thus, the reaction region 11, in which an electrochemical reaction of the fuel cells occurs, is divided into both regions with respect to the air inlet manifold hole 12 at the central portion of the bipolar plate 10.

Since the inlet and outlet manifold holes 12, 13, 14, and 15 are located at the edge portions of the reaction region 11, the air and the hydrogen flow in directions perpendicular to each other. Here, the coolant flows in various directions, such as longitudinal and transverse directions.

In addition, the bipolar plate 10 of the present disclosure includes two types of bipolar plates 10 in order to form the cathode channels as air flow fields, the anode channels as hydrogen flow fields, and the coolant channels as coolant flow fields in the fuel cell stack. That is, the bipolar plate 10 includes a cathode bipolar plate which forms the cathode channels and the coolant channels, and an anode bipolar plate which forms the anode channels and the coolant channels.

The cathode bipolar plate has the same configuration as the anode bipolar plate in terms of the positions and shapes of the air inlet and outlet manifold holes 12 and 13, hydrogen inlet and outlet manifold holes 14 and 15, and coolant inlet and outlet manifold holes 16 and 17.

However, in the exemplary embodiment, the cathode bipolar plate has an interdigitated channel structure and the anode bipolar plate has a parallel channel structure in which the anode channels are arranged in parallel with each other.

Figure 5A:
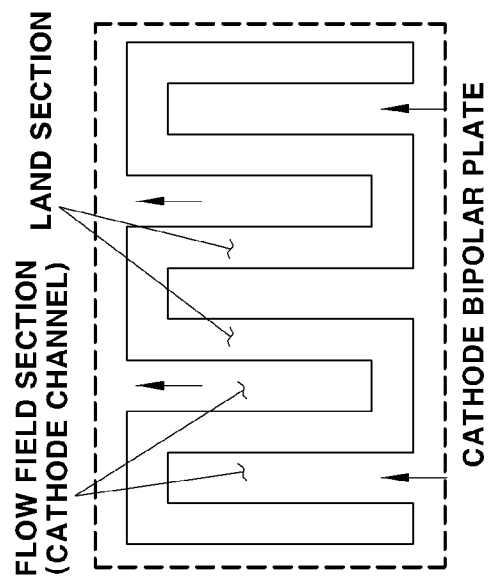
FIGS. 5A-5C are top views illustrating cathode channels, anode channels, and coolant channels, respectively, in the bipolar plate according to the embodiment of the present inventive concept.
Figure 5B:
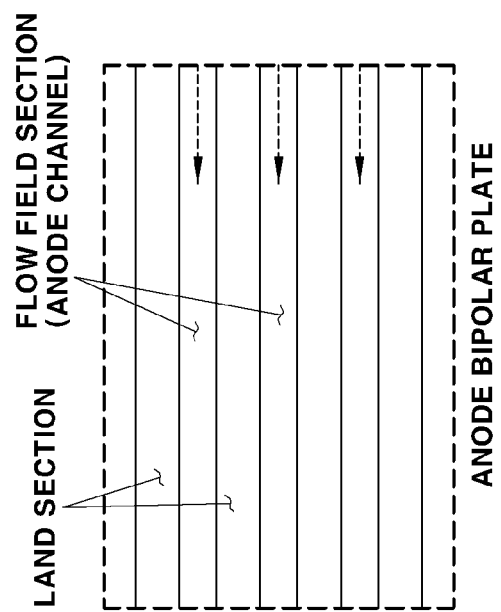
Figure 5C:
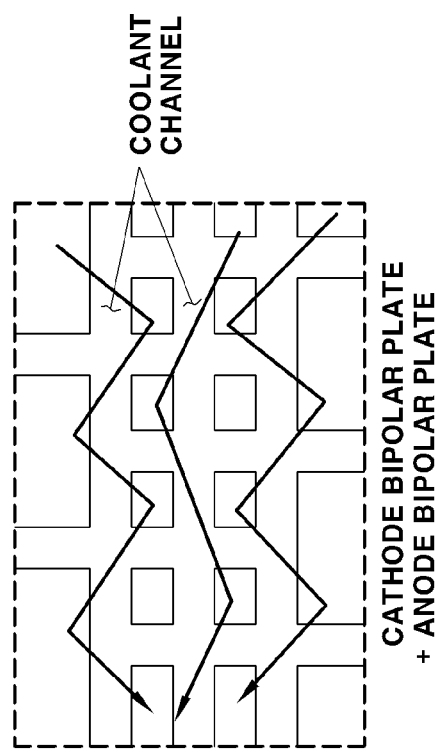

FIGS. 5A-5C are top views of portion "A" of FIG. 4 illustrating the cathode channels, the anode channels, and the coolant channels, respectively, in the bipolar plate according to the present disclosure.

As illustrated in FIG. 5A, the cathode bipolar plate having the interdigitated channel structure includes a flow field section, which has relief and intaglio patterns and forms flow fields, and a land section which is bonded to a GDL. The flow field section in the fuel cell stack forms air flow fields, i.e. the cathode channels such that air as oxidant gas flows between the flow field section and the GDL.

In a certain embodiment, the land section has a zigzag path in which a longitudinal portion and a transverse portion are alternately repeated and continued. When the cathode bipolar plate is bonded to the anode bipolar plate in the fuel cell stack in a state in which one surface of the land section is bonded to the GDL, the coolant channels are formed on another surface of the land section of the cathode bipolar plate.

In addition, as illustrated in FIG. 5B, the anode bipolar plate having the parallel channel structure includes a flow field section, which has relief and intaglio patterns and forms flow fields, and a land section bonded to the GDL. In this case, the flow field section and the land section are elongated to be in parallel with each other.

The flow field section of the anode bipolar plate in the fuel cell stack forms hydrogen flow fields, i.e. the anode channels such that hydrogen as fuel gas flows between the flow field section and the GDL. When the cathode bipolar plate is bonded to the anode bipolar plate in the fuel cell stack in a state in which one surface of the land section is bonded to the GDL, the coolant channels are formed on another surface of the land section of the anode bipolar plate.

Accordingly, the coolant channels in the fuel cell stack have a multidirectional flow field structure in which longitudinal flow fields intersect with transverse flow fields, as illustrated in FIG. 5C.

In addition, in the state in which the cathode bipolar plate is bonded to the anode bipolar plate in the fuel cell stack, the cathode channels as the air flow fields are formed on one surface of the flow field section of the cathode bipolar plate and the anode channels as the hydrogen flow fields are formed on one surface of the flow field section of the anode bipolar plate. Here, other surfaces of the flow field sections of the two bipolar plates are bonded to each other.

In addition, the cathode bipolar plate having the interdigitated channel structure as described above has an inlet and an outlet, which are separately present, and air as reactant gas crosses over through the GDL between the channels (flow field section).

When the cathode bipolar plate is bonded to the anode bipolar plate in the fuel cell stack, the flow field section of the cathode bipolar plate is perpendicular to the flow field section of the anode bipolar plate. Accordingly, the longitudinal direction of each cathode channel (the longitudinal direction of each of the bipolar plate and the reaction region) and the longitudinal direction of each anode channel (the longitudinal direction of each of the bipolar plate and the reaction region), which are formed by the flow field sections of the respective bipolar plates, are perpendicular to each other. The flow directions of air and hydrogen flowing between the GDL and MEA are also perpendicular to each other.

Since the land sections of the two bipolar plates are perpendicular to each other when the cathode bipolar plate is bonded to the anode bipolar plate in the fuel cell stack, the coolant flowing between the bipolar plates 10 has all flow directions of longitudinal and transverse directions. In this case, the coolant may flow along a zigzag path formed in such a manner that a longitudinal path and a transverse path are alternately repeated and continued.

In the bipolar plate 10 as described above, the reaction region 11 is divided into two regions with respect to the air inlet manifold hole 12 at the central portion in one cell, and the inlet and outlet manifold holes 12, 13, 14, 15, 16, and 17 are located along the edge portions of the respective reaction regions 11, as illustrated in FIG. 4. Therefore, there is no need to form a separate branch channel portion for uniform distribution of the channels, and thus, the power density may be improved.

The unit cell may have two reaction regions 11 by forming the air inlet manifold hole 12 at the central portion in the bipolar plate 10. The positions and shapes of the reaction regions 11 and the air inlet and outlet manifold holes 12 and 13 may change in various manners.

In addition, the coolant inlet and outlet manifold holes 16 and 17 are located at corner portions with respect to the respective reaction regions 11 having a rectangular shape.

The hydrogen inlet and outlet manifold holes 14 and 15 are respectively located at the short sides of the associated reaction region 11, and the air inlet and outlet manifold holes 12 and 13 are respectively located at the long sides of the associated reaction region 11.

Accordingly, the coolant is introduced through the corner portions at one side of the reaction region 11, that is, the coolant is introduced through the coolant inlet manifold holes 16 located at both sides of each hydrogen inlet manifold hole 14, and then passes through the coolant flow fields (channels) having a zigzag form between the bipolar plates 10. Then, the coolant is discharged through the corner portions at the other side of the reaction region 11, that is, the coolant is discharged through the coolant outlet manifold holes 17 located at both sides of each hydrogen outlet manifold hole 15.

In the interdigitated channel structure applied to the present disclosure, the hydrogen flow fields (hydrogen channels or anode channels) and the air flow fields (air channels or cathode channels) are perpendicular to each other instead of being located in the same direction. The length of each air flow field in the interdigitated channel structure is short enough to be close to the width size of the reaction region of the bipolar plate 10.

As the channel length in the interdigitated channel structure becomes longer, a differential pressure between the inlet and the outlet for the reactant gases in the bipolar plate 10 increases and the flow effect in which the reactant gases cross over between the channels through the GDL decreases. Thus, performance of the interdigitated channels is reduced.

In particular, when the channel length in the interdigitated channel structure is long, the performance similar to that of the general parallel channel structure is exhibited and it is difficult to increase the limiting current density and water discharge capability in the GDL.

In contrast, when the channel length in the interdigitated channel structure is short, the performance and the power density are increased.

As the channel length in the interdigitated channel structure is shorter, a convection effect through the GDL between the channels increases. Therefore, it is possible to maximize the limiting current density.

In this regard, when interdigitated channels of the bipolar plate 10 are applied in a short-side direction of the rectangular reaction region 11 in the bipolar plate 10 for the fuel cell having the reaction region 11 which has long sides and short sides, the limiting current density may be significantly increased compared to that in the general parallel channel. Consequently, the power density is also increased, and thus, the performance of the stack may be improved and the size of the stack may be reduced.

Accordingly, in the present disclosure, the air inlet manifold hole 12 and the air outlet manifold holes 13 are formed along long-side edge portions of the reaction region 11 in the bipolar plate 10. The air flow fields have the interdigitated channels, and the flow direction of air is set to be the direction (the width direction of the reaction region) perpendicular to the flow direction of hydrogen (the longitudinal direction of the reaction region). The length of each air channel in the interdigitated channel structure is short enough to be close to the width size of the reaction region 11.

In addition, since the diffusion of hydrogen itself is high in the hydrogen flow fields, there is no difference between the interdigitated channel structure and the parallel channel structure. Therefore, the hydrogen flow fields are configured of the parallel channels having a low differential pressure.

The coolant flow fields have the zigzag channel structure using the land sections of the cathode bipolar plate and the anode bipolar plate, rather than having the simple parallel structure as in the related art, thereby increasing a contact area with water.

Accordingly, it is possible to increase the cooling efficiency of the fuel cell and control the entire reaction region at a uniform temperature by reducing a difference in temperature in terms of heat transfer since the flow itself has compulsory turbulence characteristics. Therefore, the fuel cell may be more efficiently operated in terms of heat management.

FIGS. 6A-6D are top views illustrating a bipolar plate for a fuel cell and a flow field structure thereof according to another embodiment of the present inventive concept, and illustrate examples in which the bipolar plate 10 has one reaction region 11.

Referring to FIGS. 6A-6D, an air inlet manifold hole 12 is elongated along one of both long-side edge portions of the bipolar plate 10, instead of a central portion thereof, in the longitudinal direction of the bipolar plate 10. An air outlet manifold hole 13 is elongated along the other of long-side edge portions in the longitudinal direction of the bipolar plate 10.

The reaction region 11 is a rectangular region located at the center except for long-side and short-side edge portions of the bipolar plate 10. An interdigitated channel structure applied to a cathode bipolar plate and a parallel channel structure applied to an anode bipolar plate are the same as those of the embodiment in FIG. 4.

In addition, there is no difference in the structure of air flow fields (cathode channels or air channels) and hydrogen flow fields (anode channels or hydrogen channels), the structure of coolant flow fields (coolant channels) formed by a land section, a flow direction of hydrogen as fuel gas, and a flow direction of air including oxygen as oxidant gas.

Figure 6A:
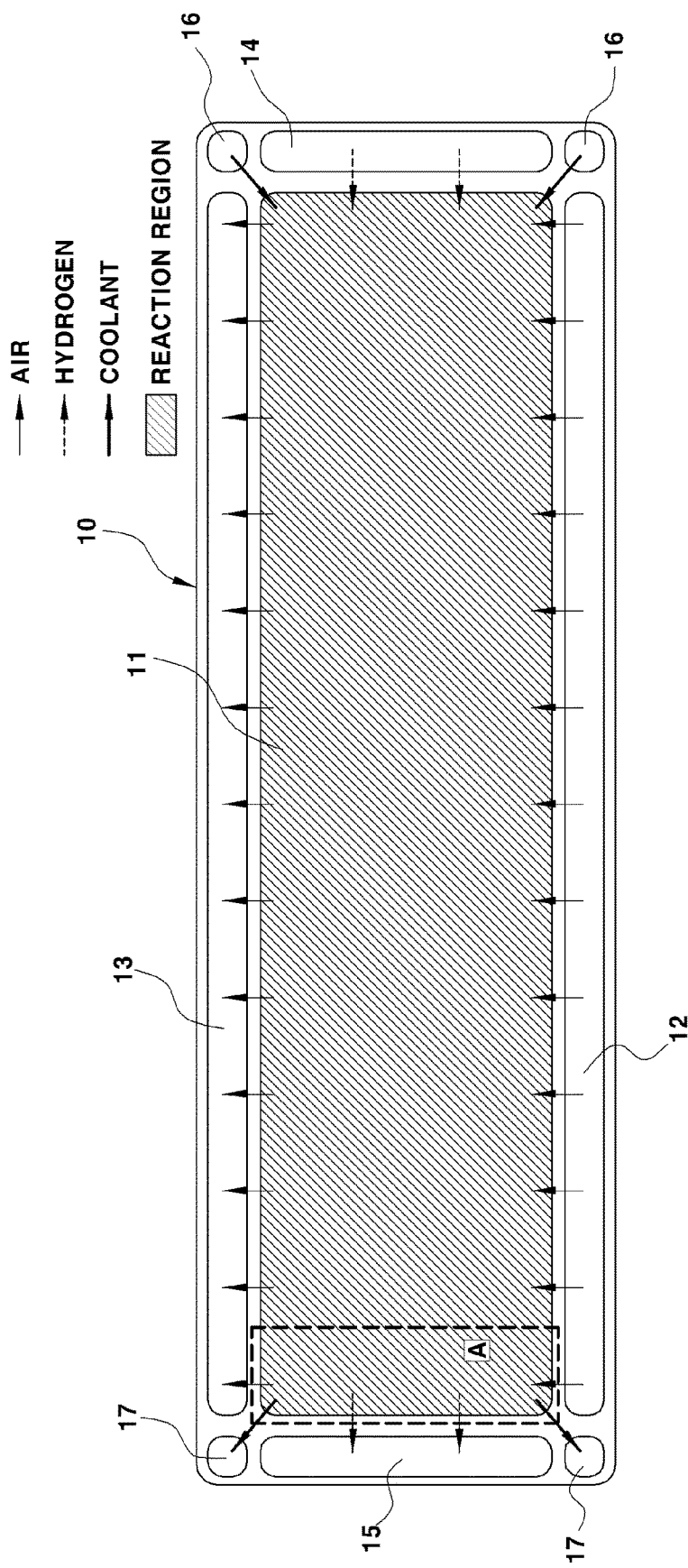
FIGS. 6A-6D are top views illustrating a bipolar plate for a fuel cell and a flow field structure thereof according to another embodiment of the present inventive concept.
Figure 6B:
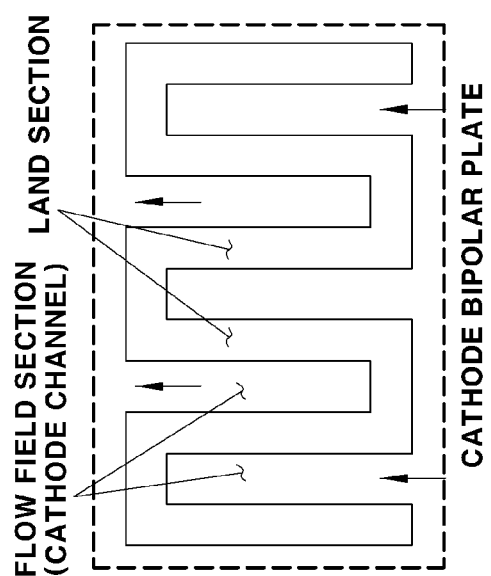
Figure 6C:
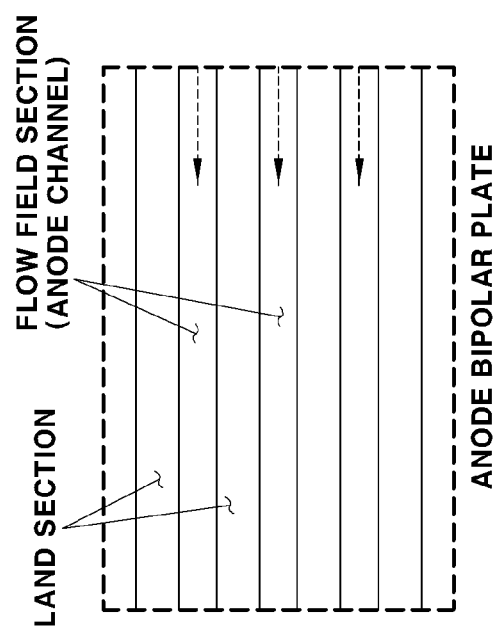
Figure 6D:
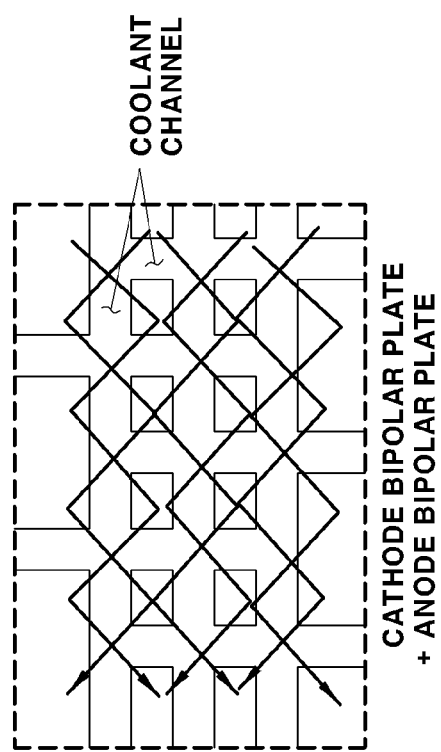
Figure 7A:
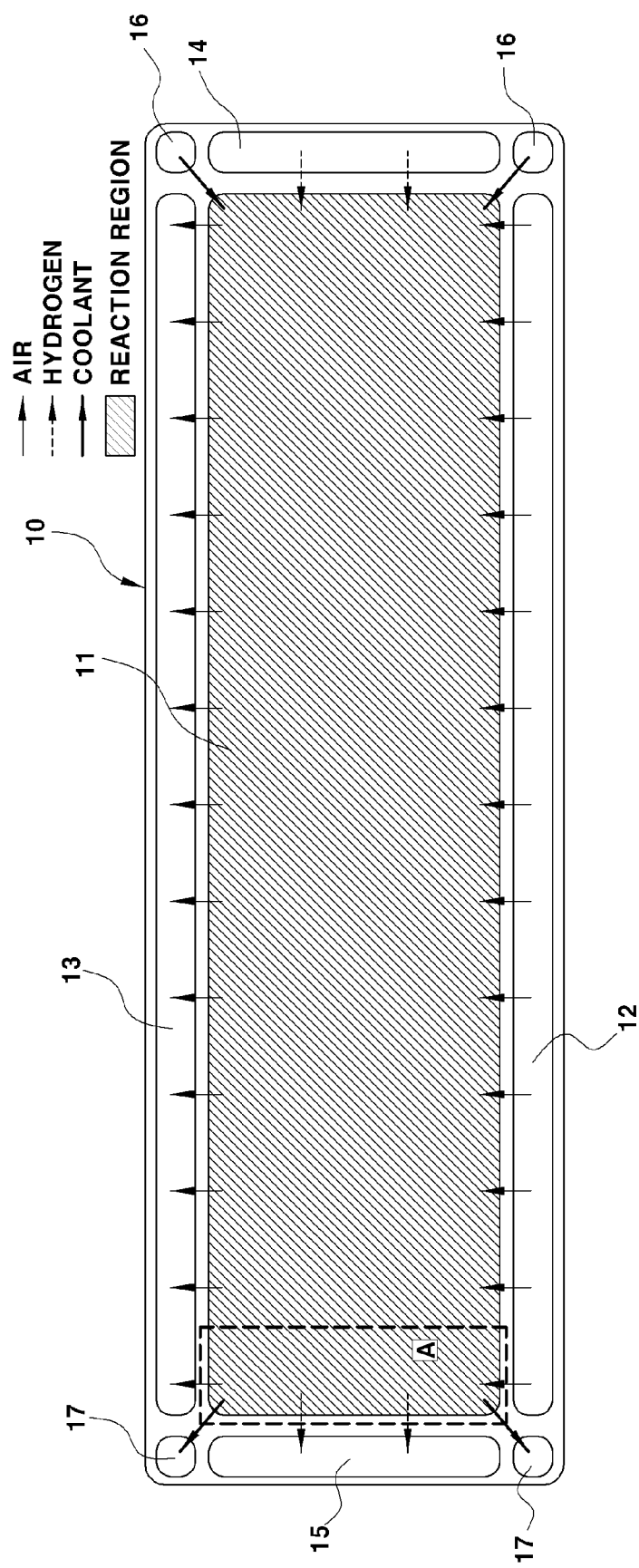
Figure 7C:
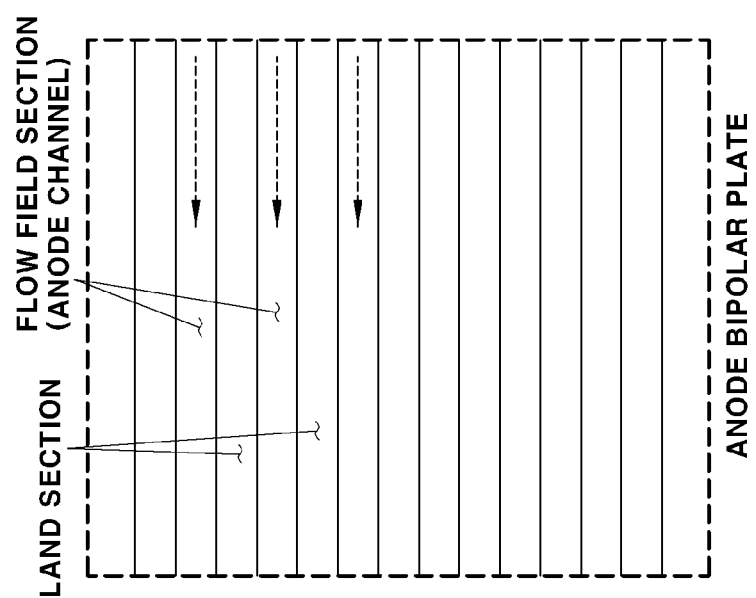
Figure 7D:
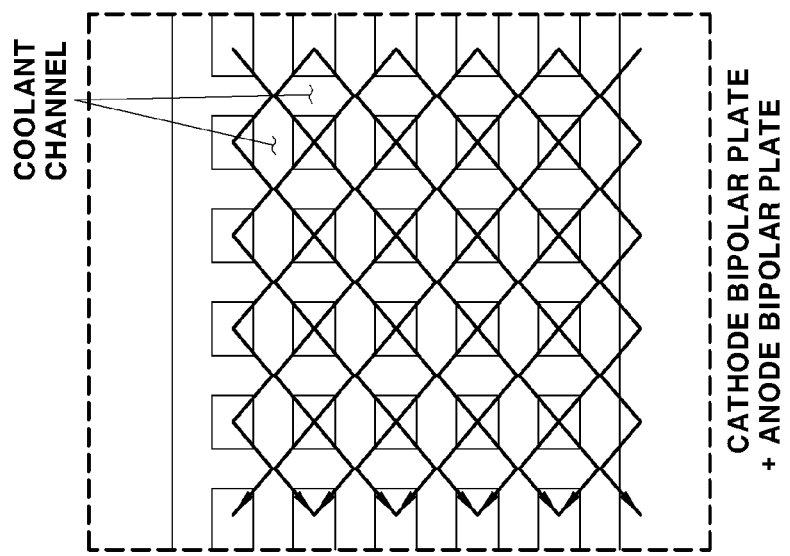

However, the embodiment of FIG. 6A differs from the above embodiment of FIG. 4 in which the two reaction regions 11 are formed in the embodiment of FIG. 4 but one reaction region 11 is formed in the embodiment of FIG. 6A. Further, air introduced through the air inlet manifold hole 12 at the central portion is distributed to both sides and then discharged to the two air outlet manifold holes 13 in the embodiment of FIG. 4, but air introduced through the air inlet manifold hole 12 located at one long side is transported in the width direction of the bipolar plate 10 (in the width direction of the reaction region) and then discharged to the air outlet manifold hole 13 located at the other long side in the embodiment of FIG. 6A.

FIGS. 7A-7D are top views illustrating a bipolar plate for a fuel cell and a flow field structure thereof according to a further embodiment of the present inventive concept. The present embodiment of FIGS. 7A-7D differs from the above embodiment of FIGS. 6A-6D in terms of an air flow field structure of a cathode bipolar plate, that is, the shapes of interdigitated channels and the shapes of coolant channels formed by a land section as the shapes of cathode channels (air flow fields) vary.

The other configurations of the embodiment in FIGS. 7A-7D except for the above difference are the same as those of the embodiment in FIGS. 6A-6D.

The cathode channels of the cathode bipolar plate in the embodiment of FIGS. 7A-7D have a basic interdigitated channel structure in which an inlet and an outlet for air as reactant gas are separately present and air crosses over through the GDL coming into contact with the land section between the flow fields (channels). However, the embodiment of FIGS. 7A-7D has different shape of the land section from the embodiments of FIGS. 4-6D.

The flow direction of air is perpendicular to the flow direction of hydrogen in the embodiments of FIGS. 4-6D. However, in the embodiment of FIGS. 7A-D, at least a portion of the land section bonded to the GDL has a closed form in the cathode bipolar plate, and thus, a plurality of enclosed flow field sections is formed. The whole circumference of each enclosed flow field section is blocked by the closed land section between the cathode bipolar plate and the GDL.

In this case, the land section is formed such that the enclosed flow field sections are laterally arranged. The air introduce into the inlet portion for air in the channels laterally crosses over through the GDL coming into contact with the land section to sequentially pass through adjacent enclosed flow field sections, and then flows to the outlet portions for air in the channels.

FIGS. 8A-8D are top views illustrating various examples in which positions of coolant inlet and outlet manifold holes are changed in the bipolar plate according to the present disclosure. The configurations of the embodiment are the same as those of the above embodiments, except that the positions of the coolant inlet and outlet manifold holes 16 and 17 are changed.

Figure 8A:
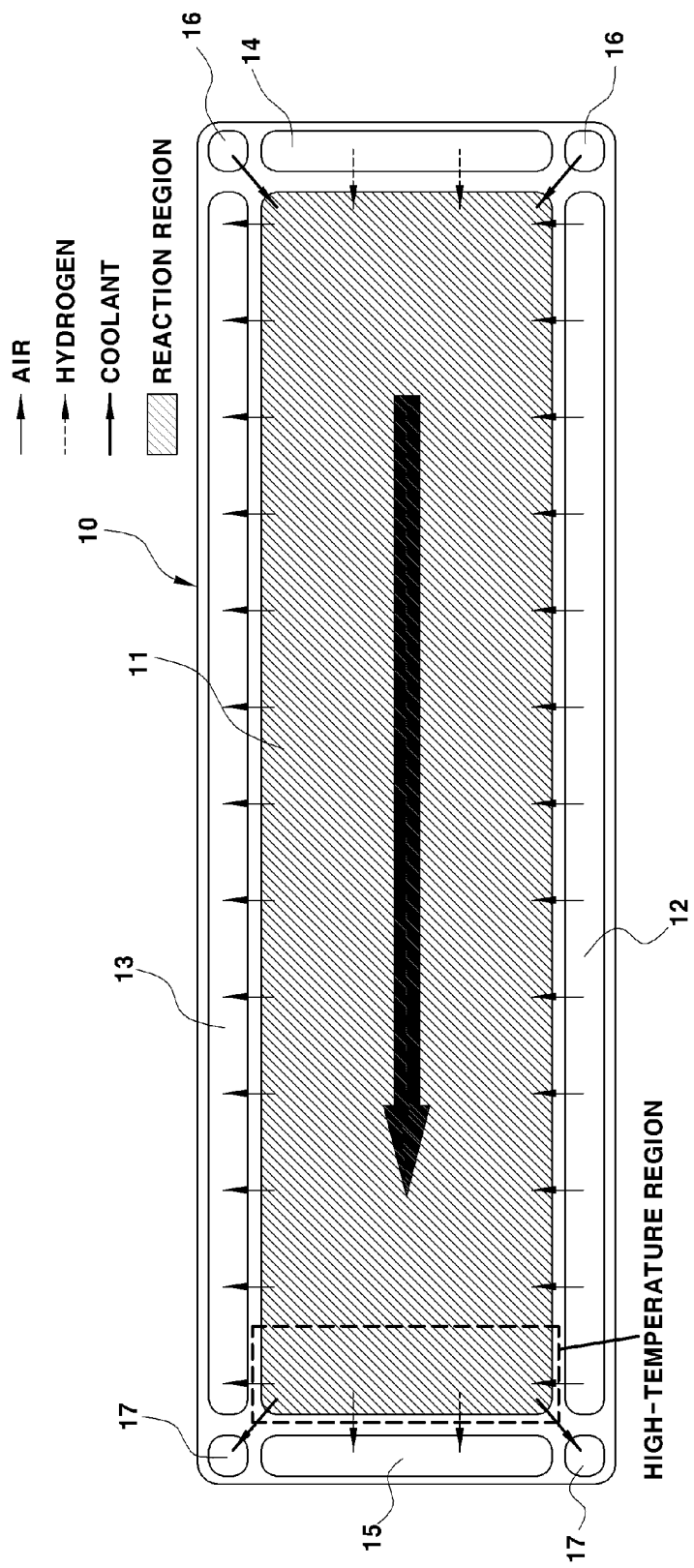
FIGS. 8A-8D are top views illustrating various examples in which positions of coolant inlet and outlet manifold holes are changed in the bipolar plate according to the present inventive concept.

As illustrated in FIGS. 8A-8D, the temperature distribution in the reaction region 11 may vary according to the positions of the coolant inlet and outlet manifold holes 16 and 17. As illustrated in FIG. 8A, when the coolant inlet manifold holes 16 are located at corners of the reaction region 11 in short-side edge portions, each being one end portion of the long side in the longitudinal direction thereof, and the coolant outlet manifold holes 17 are located at corners of the reaction region 11 in the short-side edge portions, each being another end portion of the long side in the longitudinal direction thereof, a side portion in which the coolant outlet manifold holes 17 are located in the reaction region 11 is a high-temperature region.

Figure 8B:
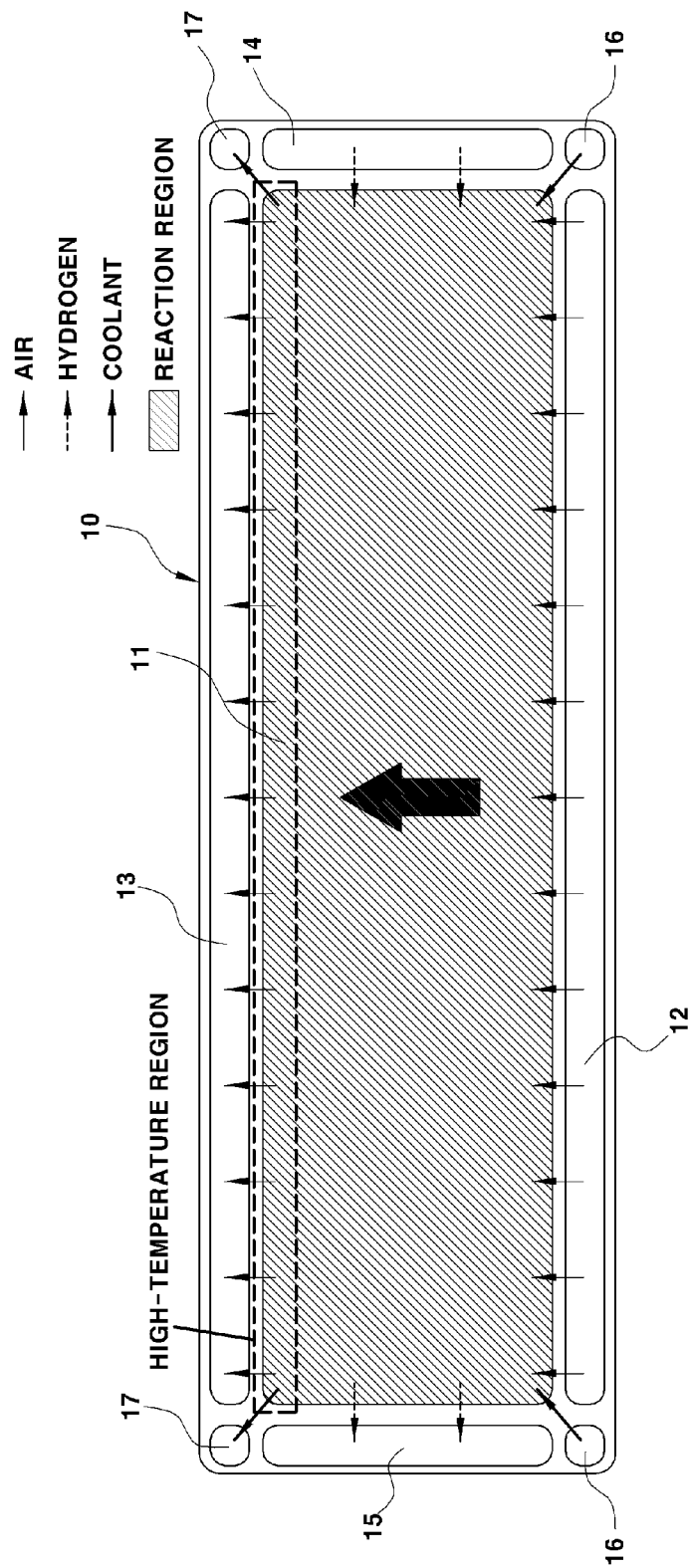

In FIG. 8B, the coolant inlet manifold holes 16 are located at one end portion of the reaction region in the width direction thereof, and the coolant outlet manifold holes 17 are located at another end portion thereof. The side portion in which the coolant outlet manifold holes 17 are located in the reaction region 11 is also a high-temperature region.

Figure 8C:
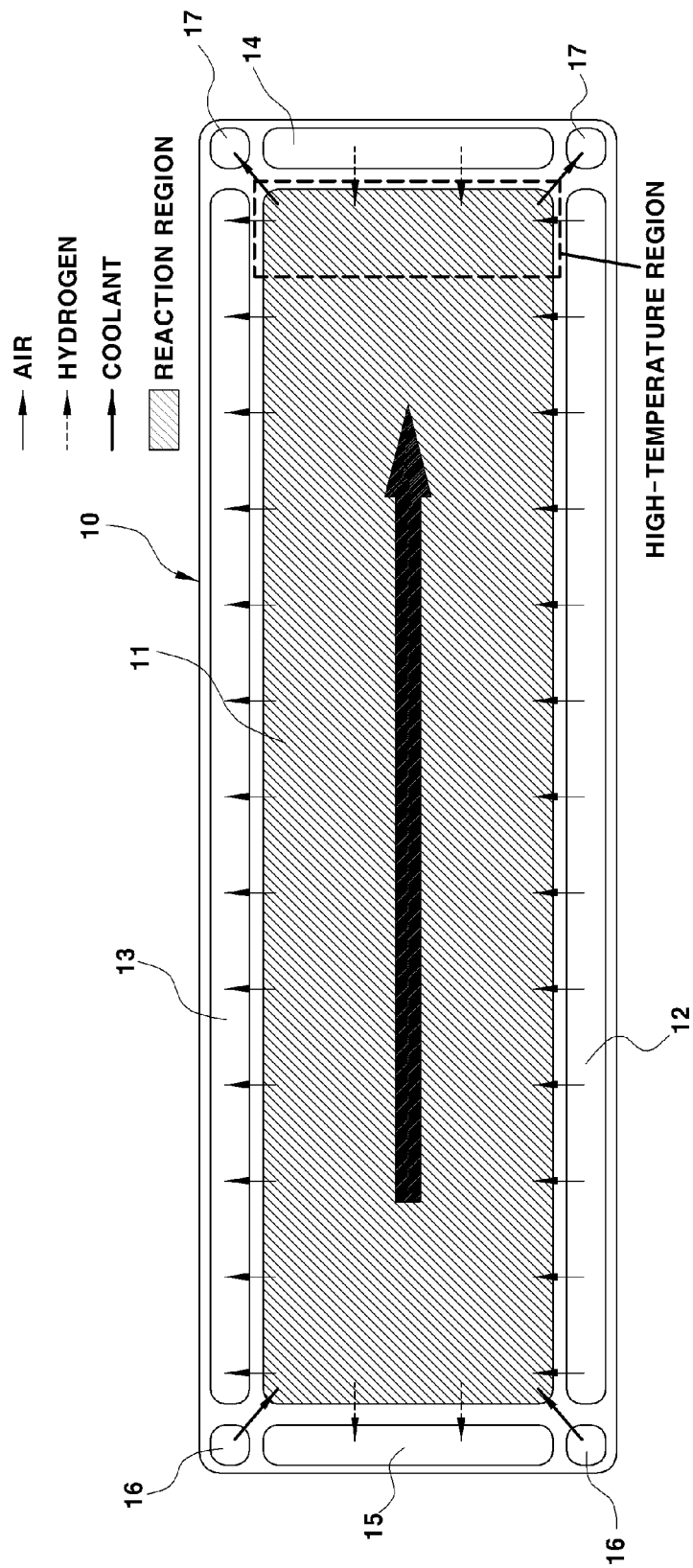

Unlike FIG. 8A, the positions of the coolant inlet manifold holes 16 and the coolant outlet manifold holes 17 are reversed in FIG. 8C. Unlike the case of FIG. 8B, the positions of the coolant inlet manifold holes 16 and the coolant outlet manifold holes 17 are reversed in FIG. 8D.

Figure 8D:
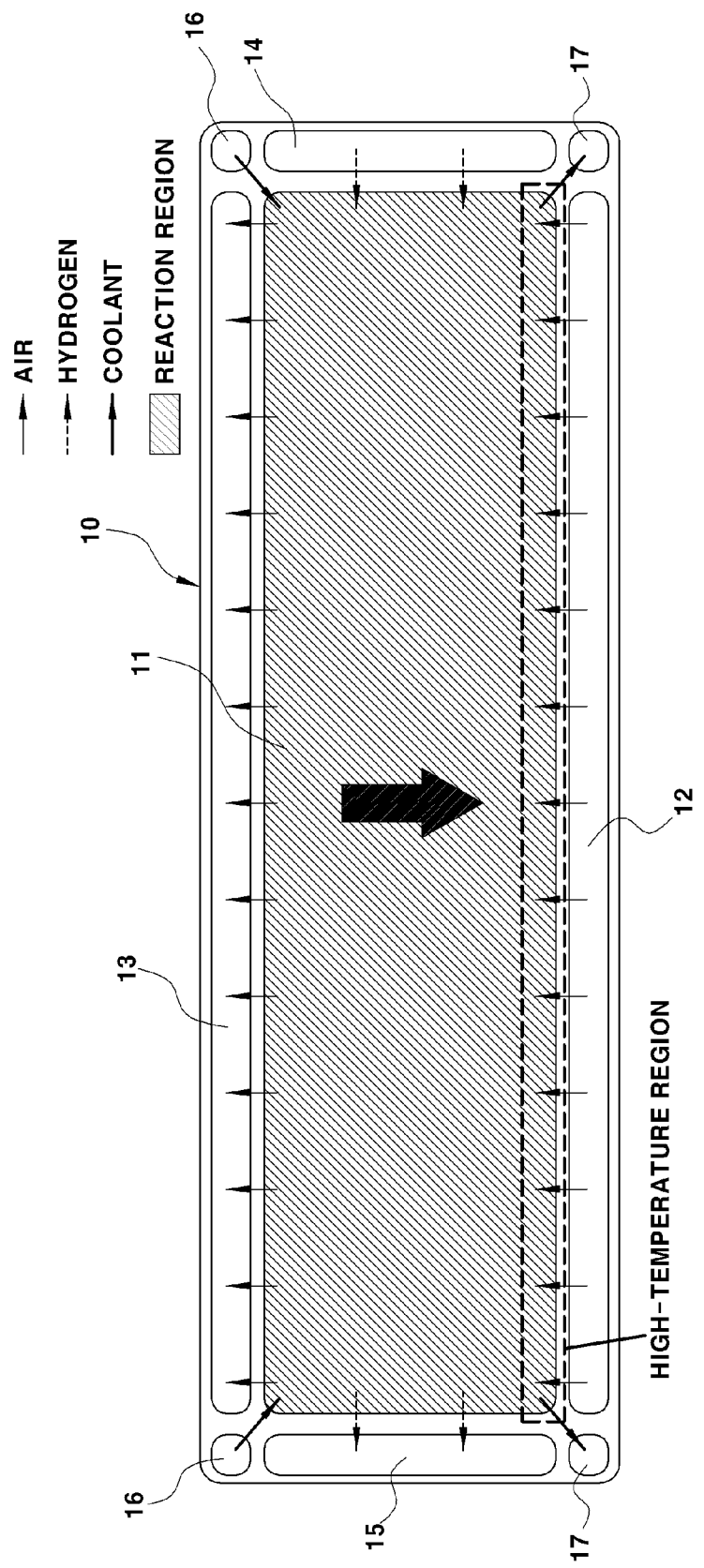

In FIGS. 8C and 8D, the side portion in which the coolant outlet manifold holes 17 are located in the reaction region 11 is a high-temperature region.

In accordance with the present disclosure, since the inlet and outlet manifold holes are located along the edge portions of the reaction region in the bipolar plate for the fuel cell, there is no need to form a separate branch channel portion for uniform distribution of the channels, and thus, the power density may be improved.

In addition, since the interdigitated channels of the bipolar plate are applied in the short-side direction of the rectangular reaction region having long sides and short sides in the bipolar plate for the fuel cell having the reaction region, the limiting current density and power density of the fuel cell stack may be significantly increased and the performance of the stack may be improved and the size of the stack can be reduced.

In addition, since the reactant gases cross over between the channels through the GDL by the application of the interdigitated channel structure, it is possible to increase the water discharge capability in the GDL.

In addition, since the coolant flow fields have the zigzag channel structure using the land sections of the cathode bipolar plate and the anode bipolar plate, instead of the simple parallel structure as in the related art, it is possible to increase the contact area with water. Thus, it is possible to improve the cooling efficiency and the thermal efficiency and control the entire reaction region at a uniform temperature since the coolant flow itself has compulsory turbulence characteristics.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A bipolar plate structure for a fuel cell, comprising:
   a cathode bipolar plate having a first flow field section to form cathode channels between the first flow field section and a first gas diffusion layer, and a first land section to form coolant channels in a state in which the first land section is bonded to the first gas diffusion layer; and
   an anode bipolar plate having a second flow field section to form anode channels between the second flow field section and a second gas diffusion layer and a second land section to form coolant channels in a state in which the second land section is bonded to the anode gas diffusion layer,
   wherein the cathode channels have an interdigitated channel structure, and the anode channels have a parallel channel structure in which flow fields are arranged in parallel with each other,
   wherein a first air inlet manifold hole elongates along a central portion between the cathode bipolar plate and the anode bipolar plate in a longitudinal direction of the cathode and anode bipolar plates, in which the first and second flow field sections and the first and second land sections are formed, in the cathode bipolar plate and the anode bipolar plate, and air outlet manifold holes elongate at both long-side edge portions of the cathode bipolar plate and the anode bipolar plate in the longitudinal direction of the cathode and anode bipolar plates, and
   wherein a longitudinal direction of each of the cathode channels is a width direction of the reaction region.

2. The bipolar plate structure of claim 1, wherein a hydrogen inlet manifold hole is formed along one of two short-side edge portions of the reaction region in each of the cathode bipolar plate and the anode bipolar plate, and a hydrogen outlet manifold hole is formed along the other of the two short-side edge portions.

3. The bipolar plate structure of claim 1, wherein the longitudinal direction of each of the cathode channels intersects with a longitudinal direction of each of the anode channels.

4. The bipolar plate structure of claim 1, wherein a longitudinal direction of each of the anode channels is a longitudinal direction of the reaction region so that the longitudinal direction of each of the cathode channels is perpendicular to a longitudinal direction of each of the anode channels.

5. The bipolar plate structure of claim 4, wherein, when surfaces of the first land section and the second land section are respectively bonded to the first and second gas diffusion layers of two adjacent fuel cells, coolant channels are formed on an opposite surface of each surface of the first and second land sections in a zigzag path form such that a longitudinal path and a transverse path of the coolant channels alternately repeat.

6. The bipolar plate structure of claim 1, wherein the first land section has a zigzag path such that a longitudinal portion and a transverse portion thereof alternately repeat.

7. The bipolar plate structure of claim 1, wherein at least one portion of the first land section has a closed form to form a plurality of enclosed first flow field sections to block the entire circumference of each enclosed first flow field section in the state in which the first land section is bonded to the first gas diffusion layer.

8. The bipolar plate structure of claim 1, wherein coolant inlet and outlet manifold holes are formed at corner portions of the reaction region.

9. The bipolar plate structure of claim 1, wherein:
   reaction regions in which the first and second flow field sections and the first and second land sections are formed are respectively located between one of the air outlet manifold holes and the first air inlet manifold hole and between the other of the air outlet manifold holes and the first air inlet manifold hole at the central portion.

10. The bipolar plate structure of claim 1, wherein:
    a second air inlet manifold hole elongates at one of both long-side edge portions of the cathode bipolar plate and the anode bipolar plate in a longitudinal direction of the cathode and anode bipolar plates, and an air outlet manifold hole elongates at the other of the long-side edge portions in the longitudinal direction of the cathode and anode bipolar plates;
    a hydrogen inlet manifold hole is formed at one of both short-side edge portions of the cathode bipolar plate and the anode bipolar plate in a width direction of the cathode and anode bipolar plates, and a hydrogen outlet manifold hole elongates at the other of the short-side edge portions in the width direction of the cathode and anode bipolar plates; and
    a reaction region in which the first and second flow field sections and the first and second land sections are formed is surrounded by the air inlet and outlet manifold holes and the hydrogen inlet and outlet manifold holes.

11. The bipolar plate structure of claim 1, wherein each of the cathode bipolar plate and the anode bipolar plate is a metallic bipolar plate which is pressed to form the first and second land sections and the first and second flow field section.

* * * * *